United States Patent [19]

Moskowitz et al.

[11] 4,287,817
[45] Sep. 8, 1981

[54] APPARATUS FOR USE IN PREPARING INFUSIONS

[75] Inventors: Paul M. Moskowitz, Brooklyn; Yuliy Rushansky, Bronx; Lester Brown, Flushing; Gerald Weinstein, Brooklyn, all of N.Y.

[73] Assignee: Salton, Inc., N.Y.

[21] Appl. No.: 912,194

[22] Filed: Jun. 5, 1978

[51] Int. Cl.³ .................. A47J 31/54; A23F 5/00
[52] U.S. Cl. .................. 99/282; 99/293; 99/285; 219/332; 219/296
[58] Field of Search .......... 219/297, 308, 309, 332, 219/333, 327, 296, 311; 99/280, 281, 282, 283, 284, 288, 293, 294; 222/146 H, 146 HE, 146 R; 239/136

[56] References Cited

U.S. PATENT DOCUMENTS

| Re. 22,879 | 5/1947 | Peters et al. | |
| 54,933 | 5/1866 | Meigs | |
| 1,937,763 | 12/1933 | Kalning | 236/66 |
| 3,031,947 | 5/1962 | Heckeroth | 99/283 |
| 3,075,453 | 1/1963 | Wagner et al. | 99/285 |
| 3,085,494 | 4/1963 | Rosander | 99/281 |
| 3,148,829 | 9/1964 | Leopardo | 236/66 |
| 3,596,588 | 8/1971 | Moss | 99/282 |
| 4,137,833 | 2/1979 | Yelloz | 99/293 |

FOREIGN PATENT DOCUMENTS 194097  3/1957  Austria .................. 99/281

Primary Examiner—C. L. Albritton
Assistant Examiner—Bernard Poskoski
Attorney, Agent, or Firm—Edward D. O'Brian

[57] ABSTRACT

An apparatus for preparing infusions such as any of several forms of the beverage coffee can be constructed so as to include an enclosed container in which water is adapted to be heated so as to be utilized either as hot water or as steam. An electric heating element is associated with the container for heating the contents of the container. A bottom outlet from the container is adapted to convey hot water and is connected to a line or conduit to the inlet of an infuser or brewing basket, the outlet of which is adapted to convey a complete beverage or infusion to an appropriate container. A top outlet from the container is adapted to convey steam from the container through an appropriate conduit or line containing at least one valve to another container where such steam may be used in preparing a beverage such as cappuccino or may be employed for generalized heating purposes. Different pressure responsive switches are connected in a circuit for operating the heating element for use in regulating the temperature of hot water supplied to the infuser and for use in regulating the temperature of the steam supplied from the container.

7 Claims, 3 Drawing Figures

APPARATUS FOR USE IN PREPARING INFUSIONS

BACKGROUND OF THE INVENTION

The invention set forth in this specification pertains to new and improved apparatus for use in preparing infusions. An apparatus in accordance with this invention is primarily intended for use in preparing different forms of the beverage coffee. However, it will be realized that an apparatus as set forth herein can also be utilized for other purposes.

In the past a wide variety of different types of coffee making apparatus have, of course, been developed and used. In at least the United States of America the most common or "normal" form of the beverage coffee is prepared by contacting ground and roasted coffee beans constrained into a brewing basket or infuser with water at a temperature slightly below the boiling point of the water. Frequently various individuals desire another form of the beverage coffee known as espresso which is prepared by contacting ground and roasted coffee beans in such an infuser or brewing basket with steam or water at a temperature somewhat above the normal boiling point of water. A third form of the beverage coffee is commonly referred to as cappuccino and is prepared by mixing espresso type coffee with milk or a similar composition and injecting steam into the mixture.

In the past it has normally been necessary to utilize a different type of coffee making apparatus for the purpose of preparing "normal" coffee and espresso. This has had the practical effect of precluding most homes and restaurants from being able to serve or provide the three different forms of the beverage coffee noted. This is frequently because a home or restaurant frequently doesn't have the space to contain the different types of apparatuses necessary to make the different types of coffee noted. Frequently equipment to make different types of coffee as indicated is unavailable simply because of economic considerations. As a result of these factors it is considered that there is a need for a new and improved apparatus which can be utilized in preparing different types of infusions such as the different types of the beverage coffee indicated in the preceding.

BRIEF SUMMARY OF THE INVENTION

An object of the present invention is to fulfill this need. More specifically the invention is intended to provide a new and improved apparatus for preparing different types of infusions such as different forms of the beverage coffee. The invention is also intended to provide such a multipurpose apparatus which is comparatively inexpensive to construct, which is comparatively easy to use, which does not present any significant safety hazard, and which is capable of being utilized over a prolonged period with minimal maintenance.

In accordance with this invention the aforenoted objectives are achieved by providing an apparatus for preparing infusions having an enclosed container which is adapted to hold water, heating means for heating the container, infusion means having an inlet and an outlet and conduit means leading through the bottom of the container to the inlet of the infusion means in which the improvement comprises: regulating means for operating the heating means at either of two different temperatures sufficient to cause the formulation of steam in the top of said container from any water located within said container at a pressure sufficient to force the water within the bottom of said container through said conduit means and said infusion means.

BRIEF DESCRIPTION OF THE DRAWING

Because of the nature of this invention it is considered that it is best more fully described with reference to the accompanying drawing in which.

Figure 1:
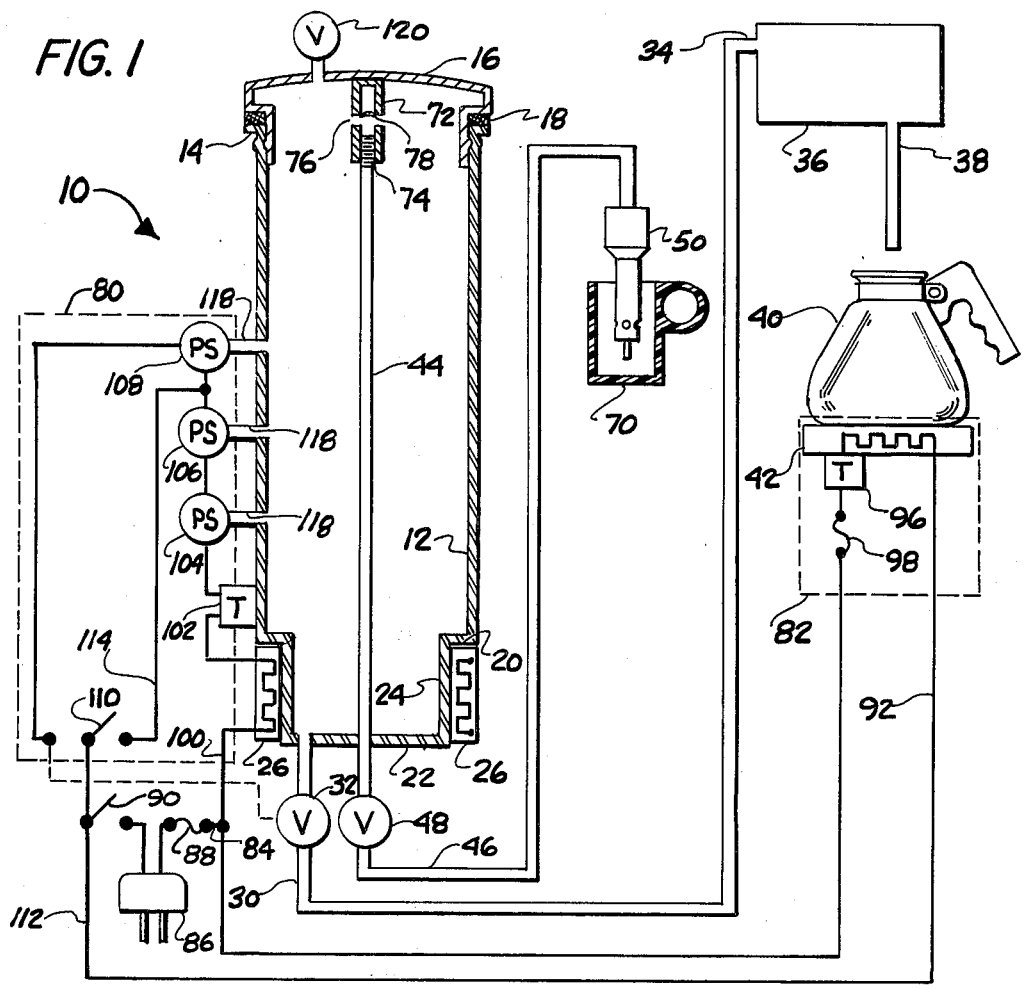
FIG. 1 is a diagrammatic view indicating the nature of a presently preferred embodiment or form of an apparatus for use in preparing infusions in accordance with this invention.

The apparatus illustrated in the drawing is intended to utilize the concepts or principles of the invention set forth and defined in the appended claims forming a part of this disclosure. Those skilled in the art of manufacturing complete infusion making apparatuses will realize that these concepts or principles can be easily employed in a variety of differently appearing and differently constructed apparatuses through the use or exercise of routine engineering skill.

DETAILED DESCRIPTION

In the drawing there is shown a complete apparatus 10 in accordance with the invention which includes a cylindrical metal container 12 located in an upright position. This container 12 has a top edge 14 which is normally closed by a lid 16. An appropriate conventional seal 18 is normally employed between the container 12 and the lid 16 for the obvious purpose. A recessed shoulder 20 is provided adjacent to the bottom 22 of the container 12 for the purpose of providing a constructed internal cup-like recess 24 adjacent to the bottom 22 within the container 12. A conventional cylindrical electric heating element 26 is located around the exterior of this recess 24 in close proximity to it.

A bottom outlet 28 leading from the bottom 22 is connected by means of a conduit 30 containing a conventional valve 32 to the inlet 34 of an infuser or brewing basket 36. Such an infuser 36 is preferably constructed as shown and described in the pending application in the United States of America in the names of Paul M. Moskowitz and Yuliy Rushansky as inventors entitled "Infuser Primarily Intended for Use in Making Coffee", U.S. Pat. No. 4,206,694 filed May 22, 1978. This infuser 36 can, however, be constructed in a variety of known manners. An outlet 38 from the infuser 36 extends so as to discharge an infusion prepared in it into an appropriate receptacle 40 such as a carafe.

Preferably the infuser 36 will be located sufficiently high relative to the container 12 so that there is no chance of liquid passing through the infuser 36 as the container 12 is filled with water. Further, the outlet 38 should preferably be spaced from the receptacle 40 a sufficient distance so that there is no chance of the contents of the receptacle 40 being syphoned back into the infuser 36 and the other parts noted. Preferably the apparatus 10 also includes another conventional electric heating element 42 which is adapted to heat the contents of the receptacle 40.

Figure 3:
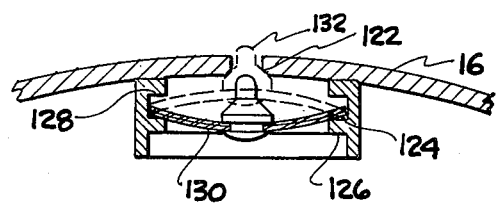
FIG. 3 is a cross-sectional view in which certain parts are shown in elevation of a steam discharge structure which is preferably utilized with an apparatus as illustrated in the preceding FIG. 1.

The container 12 also includes an elongated tube 44 extending upwardly from the bottom 22 to adjacent to the lid 16. This tube 44 extends through the bottom 22 and is connected by another conduit or line 46 through a valve 48 to an outlet structure 50. This outlet structure 50 is indicated in detail in FIG. 3 of the drawing. It includes an elongated tube 52 having an enclosed upper end 54 which is in communication with the conduit 46. If desired this upper end 54 may be referred to as a coupler valve.

Within the interior of this upper end 54 there is located a valve seat 56. A valve body 58 is normally biased by a spring 60 against the valve seat 56 so as to close off the outlet structure 50. The valve body 58 and the spring 60 are, of course, located in the upper end 54. An actuator rod 62 is connected to the valve body 58 so as to extend through the tube 52 and out through a bearing opening 64 formed in a normally closed end 66 of this tube 52. Openings 68 are preferably provided in the tube 52 a short distance above the end 66. This structure is designed so that an appropriate utensil 70 may be fitted around the tube 52 in such a manner that contact with the interior (not separately numbered) of the utensil 70 against the rod 62 will move the valve body 58 to an open position.

Preferably the tube 44 is centrally located along the axis of the container 12 so that a cylindrical dependent sleeve 72 on the lid 16 may be mounted on the tube 44 through the use of mating threads 74. When the container 12 is constructed in this manner openings 76 should be provided in the sleeve 72 so as to place the interior of the tube 44 in communication with the interior of the container 12. If desired a small shield 78 may be mounted on and above the tube 44 for the purpose of preventing water being placed within the tube 44 for the purpose of preventing water being placed within the tube 44 as water is being placed within the container 12. With the described structure the manner in which the lid 16 fits with respect to the container 12 limits movement of the lid 16 so that the openings 76 are not blocked off as the lid 16 is assembled upon the container 12.

The various parts of the apparatus 10 described in the preceding are adapted to be utilized through the use of a circuit (not separately numbered) consisting of two separate circuits 80 and 82 which are connected in parallel across the ends (not separately numbered) of a line 84 containing a conventional AC power source 86, a fuse 88 and a master on/off switch 90. The circuit 82 includes a line 92 containing in series the heating element 42, and a known thermostat 96 used in maintaining the temperature of the heating element 42 at a satisfactory level so as to maintain the contents of the receptacle 40 at a proper temperature for consumption. The line 92 may also contain a fuse 98 for the obvious purpose.

The circuit 80 includes a line 100 connecting in series with a thermostat 102 and three different series pressure responsive switches 104, 106 and 108 to a terminal (not separately numbered) of a switch 110. All three of these switches 104, 106 and 108 are of conventional construction and are of such a character as to be normally closed. This switch 110 is connected by another line 112 to the end (not separately numbered) of the line 84 remote from the line 100. This switch 110 is as noted constructed so that it may be manipulated so as to open the connection between the lines 112 and 100 and so as to connect the line 112 to a further line 114 which is connected to the line 100 between the switches 106 and 108.

In the apparatus 10 the switches 90 and 110 and the valves 32 and 48 may be independently opened and closed. However, it is preferred to couple these switches 90 and 110 with the valves 32 and 48 in accordance with conventional mechanical practice so as to obtain a mechanical sequence of opening and closing indicated in the following discussion.

When the switch 90 is open regardless of the position of the switch 110 both the valves 32 and 48 will be closed. When the switch 90 is closed the switch 110 will be in either of the two closed positions indicated depending upon the intended manner of use of the apparatus 10. When the switch 110 is closed so that a current will flow through all of the switches 104, 106 and 108 and the thermostat 102 the valve 32 will be open while the valve 48 will be closed. On the other hand, when the switch 110 is positioned so that current does not flow through the switch 108 but instead goes only through the thermostat 102 and the switches 104 and 106 the valve 32 will be closed while the valve 48 will be open or closed depending upon how the apparatus 10 is used.

Mechanical coupling of the switches 90 and 110 and the valves 32 and 48 to accomplish these parts being opened and closed as noted can easily be accomplished in a number of different ways. It is considered most expeditious to accomplish the desired manner of mechanical coupling through the use of a series of cams (not separately numbered) mounted upon a common shaft (not shown) in accordance with conventional practice. Obviously other mechanical equivalent means of accomplishing the manner of opening and closing indicated in the preceding discussion can be utilized. The use of a series of cams as described is considered to be preferable.

The manner of operation of the complete apparatus 10 is comparatively simple. When the apparatus 10 is to be utilized in preparing what may be referred to as "normal" coffee roasted, ground coffee beans are, of course, placed in the infuser 36. The manner of accomplishing this will of course vary depending upon the construction of the infuser 36. At this point the valve 32 should be closed; preferably the valve 48 is also closed. Next the lid 16 is removed from the container 12 and a quantity of water corresponding to the quantity of beverage to be prepared will be placed within this container 12. The lid 16 is then replaced upon the container 12. Next the switch 90 is closed with the switch 110 in a position to connect the switch 108 into the "operative" circuit 80 along with the other switches 104 and 106.

The actuation of the switch 90 will, of course, serve to supply power to the heating element 42 so as to maintain this heating element 42 at a temperature as set by the thermostat 96. Current will also flow in the circuit 80 so as to cause heating of the heating element 26. This will result in the water within the container 12 becoming heated to a point sufficient that such water will boil. As a result of the accumulation of steam within the upper extremity (not numbered) of the container 12 under the lid 16 the water within the container 12 will be forced through the outlet 28 and the valve 32 to the infuser 36 through the conduit 30. The beverage coffee will be formed within this infuser 36 as the water flows in this manner and will be delivered to the receptacle 40 through the outlet 38.

When the water is substantially all moved out of the container 12 by the action indicated in the preceding as a result of the operation of the pressure responsive switch 108, current will no longer be supplied through the circuit 80 so as to operate the heating element 26. This is best explained by discussing the switch 108 in reasonable detail.

This switch 108 and the other switches 104 and 106 are connected to the interior of the container 12 by means of short connections 118 which will convey any pressure within the container 12 to them. The particular switch 108 is constructed so as to be responsive to a pressure within the container 12 which is just slightly higher than and which closely approximates the pressure within the container 12 after water is removed from this container 12 as the apparatus 10 is used to make "normal" coffee as discussed in the preceding. When the switch 108 is subjected to this pressure it will automatically open and remain open as long as this pressure is maintained. At the same time the switches 104 and 106 and the thermostat 102 will remain closed.

After the completion of a "brewing" cycle as indicated in the preceding the apparatus 10 will normally be shut off by opening the switch 90 prior to being utilized in the manner previously described in preparing additional of the beverage coffee. If additional coffee beverage is to be prepared it is, of course, desirable to replace the previously extracted roasted, ground coffee beans within the infuser 36.

When the apparatus 10 is to be utilized in preparing what is referred to as the beverage espresso this apparatus 10 will be utilized as indicated in the preceding discussion. However, in preparing the beverage espresso the switch 110 will not be used as indicated in the preceding but will be positioned so that current will flow through the line 114 so as to bypass the pressure responsive switch 108. Again, the valve 32 will be open while the valve 48 will be closed. After the water has been removed from the interior of the container 12 the pressure of the gas mixture within the container 12 will serve to open the switch 106 so that power will no longer be supplied to the heating element 26. Because of the higher temperature utilized in preparing the beverage espresso this switch 108 will be set to open at a somewhat higher pressure than the pressure which will open the switch 108. This pressure will correspond to and approximate a pressure which corresponds with water temperature utilized to make the beverage espresso.

When it is desired to utilize the apparatus 10 to produce steam for use in making the beverage cappuccino it is, of course, not necessary to place roasted, ground coffee within the infuser 36. When the apparatus 10 is to be employed for this purpose the switches 90 and 110 will be set for the production of the beverage espresso as indicated in the preceding but the valve 32 will be closed while the valve 48 will be open. As a result of this as water within the container 12 is heated steam will be given off which will pass into the tube 44 through the line 46 to the upper end 54 of the tube 52.

As pointed out in the preceding this upper end 54 in effect serves as a valve which will hold back any such steam until such time as it is opened. When the actuator rod 62 is pushed by contact with a utensil such as the utensil 70 the "valve" in the upper end 54 of the tube 52 will open. As the utensil 70 is brought into position as noted against the bottom of the rod 62 it should contain the ingredients normally employed in creating the beverage cappuccino. During the period of such contact steam will move into the interior of the utensil 70. Preferably the openings 68 are positioned relative to the rod 62 so that when the rod 62 is actuated this steam will be emitted above the bottom (not separately numbered) of the utensil 70 a sufficient distance to produce an effective froth or foam from the contents of this utensil.

In considering the preceding it should be noted that the complete apparatus 10 includes several safety features which are not specifically indicated as such. The function of the fuses 88 and 98 as safety features will, of course, be obvious. To a degree the thermostat 96 may also be considered as a safety feature since it will open upon heating beyond a desired temperature. The thermostat 102 is preferably mounted immediately adjacent to the container 12 and the heating element 26 and is preferably set to open at a temperature above any temperature which will normally be encountered during the operation of the apparatus 10. Similarly the pressure responsive switch 104 is set so as to open in response to any internal pressure within the container 12 which is significantly above any pressure which will normally be developed within the container 12 during the operation of the apparatus 10 but which is below a pressure at which this container 12 would rupture. Because of this switch 104 and the thermostat 102 there is substantially no danger of steam being developed within the container 12 at a temperature and pressure which would cause this container 12 to rupture.

Figure 2:
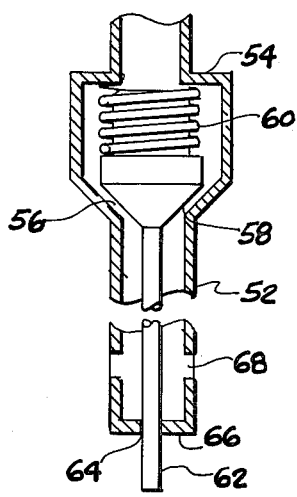
FIG. 2 is a cross-sectional view in which certain parts are shown in elevation illustrating a presently preferred vent valve which is preferably used venting a container as illustrated in the preceding FIG. 1.

Preferably the apparatus 10 includes an additional feature which will minimize the presence of any air within this container 12. This is considered desirable in avoiding a possibility of significant quantities of air contaminating or diluting steam used as indicated in the preceding in forming the beverage cappuccino. This feature takes the form of a small valve 120 as indicated in FIGS. 1 and 2 which is mounted on the lid 16.

This valve 120 includes a portion of the lid 16 (not separately numbered) having a centrally located opening 122 serving as a valve seat. Dependent from the lid 16 concentrically around the opening 122 is a small cylindrical sleeve 124 having an internal bottom flange 126 and a parallel, spaced internal flange 128 located immediately above the flange 126. A small bimetal concave-convex disk-like washer 130 fits loosely between the flanges 124 and 126. A small valve body 132 adapted to fit relative to the lid 16 so as to close off the opening 122 is mounted on the center of this washer 130.

It is believed that the operation of the valve 130 will be essentially self-obvious. As the apparatus 10 is used as described in the preceding and as the heating element 126 is initially operated the air above any water within the container 12 will heat up and expand in volume as it gradually becomes permeated with water vapor. Such air will move around and displace to a degree the washer 130 so as to flow outwardly through the opening 122. As the washer 130 approaches the temperature of steam it will become heated sufficiently so as to "snap" through an overcenter position. In such an overcenter position the washer 130 will rest against the flange 126 and hold the valve body 132 so as to form a seal closing off the opening 122. When, after the use of the apparatus 10, the washer 130 cools sufficiently it will revert to its initial configuration, opening the opening 122.

It is, of course, possible to modify the apparatus 10 in a number of other different ways which do not affect the basic operation of this apparatus 10. As an example of this a small conventional valve (not shown) can be mounted on the lid 16 for the purpose of bleeding off any accumulated steam in the container 12 at the end of a brewing cycle. Similarly the lid 16 can be mounted in place on the container 12 in a number of different conventional ways.

Also, it is not to be assumed that the apparatus 10 is of use only in connection with the preparation of different forms of the beverage coffee. This apparatus 10 can be employed in making somewhat different infusions from a variety of different materials such as, for example, dried leaves of different types as are employed in making various common and uncommon types of teas. Similarly when the apparatus 10 is employed in the manner described for making cappuccino it can instead be utilized to heat up cold cups of coffee or tea or even to prepare small quantities of soups or the like.

We claim:

1. In an apparatus for use in preparing infusions having an enclosed container, heating means for heating said container, infuser means having an inlet and an outlet, conduit means leading from the bottom of the container to said inlet in which the improvement comprises:
    said heating means comprises an electric heating element,
    regulating means for operating said heating means at either of two different temperatures sufficient to cause the formation of steam in the top of said container from any water located within said container at a pressure sufficient to force water within the bottom of said container through said conduit means and said infuser means,
    said regulating means comprises two separate, normally closed pressure sensitive switches which are capable of opening at different pressures connected in series with said heating element, said separate switches being connected to the interior of said container and being capable of being opened at different pressures within the interior of said container,
    said regulating means also including a control switch for removing the one of said pressure sensitive switches which opens in response to the lowest of said pressures from said series circuit,
    said regulating means also including a third normally closed pressure sensitive switch which is capable of opening at a third pressure higher than the pressures at which said two pressure sensitive switches open, said third switch being located in said series circuit so as to be uneffected by said control switch, said third switch being connected to the interior of said container and being capable of being opened in response to pressure within the interior of said container, and including,
    second conduit means for conveying steam leading downwardly from the interior of said container adjacent to the top thereof, and
    valve means for controlling the movement of steam through said second conduit means,
    a temperature responsive vent valve located in the top of said container, said valve being normally open and being responsive to an increase in temperature so as to close, said vent valve being responsive so as to close at a temperature below the temperature at which steam will accumulate in the top of said container at a temperature such that the pressure within said container is sufficient to force water within the bottom of said container through said conduit means and said infuser means to close.

2. An apparatus as claimed in claim 1 including:
    a discharge tube attached to the end of said second conduit means remote from said container.

3. An apparatus as claimed in claim 2 wherein:
    said valve means is normally closed and is located within said tube,
    said valve means includes spring means for biasing said valve means closed and a valve actuator extending through said tube, said actuator being capable of being engaged with the interior of a receptacle so as to open said valve means.

4. An apparatus as claimed in claim 2 wherein:
    said discharge tube has steam discharge openings located therein above the bottom thereof on the side of said other valve means remote from said second conduit.

5. An apparatus as claimed in claim 3 including:
    other valve means for controlling the movement of steam through said second conduit means.

6. In an apparatus for use in preparing infusions having an enclosed container, heating means for heating said container, infuser means having an inlet and an outlet, conduit means leading from the bottom of the container to said inlet in which the improvement comprises:
    said heating means comprises an electric heating element,
    regulating means for operating said heating means at either of two different temperatures sufficient to cause the formation of steam in the top of said container from any water located within said container at a pressure sufficient to force water within the bottom of said container through said conduit means and said infuser means,
    said regulating means comprises two separate, normally closed pressure sensitive switches which are capable of opening at different pressures connected in series with said heating element,
    said regulating means also including a control switch for removing the one of said pressure sensitive switches which opens in response to the lowest of said pressures from said series circuit,
    said regulating means also includes a third normally closed pressure sensitive switch which is capable of opening at a third pressure higher than the pressures at which said two pressure sensitive switches open, said third switch being located in said series circuit, and including,
    second conduit means for conveying steam leading from the interior of said container adjacent to the top thereof, and
    valve means for controlling the movement of steam through said second conduit means,
    a discharge tube attached to the end of said second conduit means remote from said container, and wherein,
    said valve means is normally closed and is located within said tube,
    said valve means includes spring means for biasing said valve means closed and a valve actuator extending through said tube, said actuator being capable of being engaged with the interior of a receptacle so as to open said valve means,
    said discharge tube has steam discharge openings located therein above the bottom thereof on the side of said other valve means remote from said second conduit, and including, other valve means for controlling the movement of steam through said second conduit means.

7. An apparatus as claimed in claim 6 including:

a temperature responsive vent valve located in the top of said container, said valve being normally open and being responsive to an increase in temperature so as to close, said vent valve being responsive so as to close at a temperature below the temperature at which steam will accumulate in the top of said container at a temperature such that the pressure within said container is sufficient to force water within the bottom of said container through said conduit means and said infuser means to close.

* * * * *